Aug. 12, 1958     C. E. HORN     2,846,874
ULTRASONIC TESTING DEVICE

Filed Feb. 24, 1956     3 Sheets-Sheet 1

INVENTOR.
CHARLES E. HORN
BY
ATTORNEY

Aug. 12, 1958

C. E. HORN 2,846,874

ULTRASONIC TESTING DEVICE

Filed Feb. 24, 1956

INVENTOR.
CHARLES E. HORN

BY

ATTORNEY

TUNING "A"

VOID

BONDED

TUNING "B"

VOID

BONDED

INVENTOR.
CHARLES E. HORN
BY
ATTORNEY

United States Patent Office 2,846,874
Patented Aug. 12, 1958

2,846,874

ULTRASONIC TESTING DEVICE

Charles E. Horn, Fort Worth, Tex., assignor to General Dynamics Corporation, San Diego, Calif., a corporation of Delaware Application February 24, 1956, Serial No. 567,558

7 Claims. (Cl. 73—67.1)

The present invention relates generally to mechanical vibration responsive devices. More particularly, the invention relates to an improved apparatus adapted for inducing mechanical vibrations into a test object by ultrasonic energy, and improved means for detecting and visually indicating the change in frequency response that is produced by mechanically coupling the oscillating electro-mechanical system to a test material of varying density; the impedance response curve, as a function of frequency, being picked up, displayed and measured upon the screen of a conventional oscilloscope.

In adhesively bonded materials and structures it is desirable, particularly in the construction of aircraft, that means be available for the non-destructive testing of bond strength or for detection of a condition-of-the-bond that could contribute to bond failure in the structural components which are adhesively joined together. A comparative method of measuring mechanical impedance of the facing structure and relating such impedance to the condition of the bond has been devised, together with an apparatus for effectuating said method which comprises the present invention.

When a piezoelectric crystal is excited at its natural resonant frequency, its electrical impedance, as seen by the exciting voltage, will be some function of the mechanical impedance of the load imposed upon the faces of the crystal. As related to this invention, said load is the adhesively bonded aircraft structure and a means is provided to detect, visually indicate, and measure this reflected mechanical impedance as a response curve on a visual media, such as an oscilloscope.

Employment of adhesively bonded aircraft structures greatly enhance the strength, weight and rigidity design requirements of modern aircraft. In such construction, it is usually essential that an optimum in physically strong, yet light-weight and rigid structure be achieved. This type of airframe structure and skin can never be accepted as structurally reliable without a method and means for testing of the adhesive bond before the aircraft is put into operation. No conventional instrument has heretofore been available for this purpose, destructive testing being the accepted conventional mode.

It is accordingly the principal object of the present invention to provide means for testing condition-of-bond in adhesively bonded aircraft skins, structures and the like.

A further object of the invention is to provide an improved apparatus adapted for coupling a piezoelectric transducer to a bonded material and excitation of said transducer at its natural resonant frequency, with means embodied for detecting the reflected mechanical impedance of the object bonded material and relating the detected response to physical condition of the bond being tested.

Another object of the invention is to provide an improved apparatus adapted for the detection and indication, through a visual response medium, voids which may exist in the adhesives of bonded materials.

Other objects reside in an apparatus of the above class and character which is greatly simplified in design and construction, is economical to manufacture and is sufficiently compact and light in weight as to be easily portable by one man.

These and other objects and advantages of the invention, which consists in the several novel features hereinafter set forth, will become more readily apparent from the following description of the appended diagrams and drawings, wherein.

Figure 1:
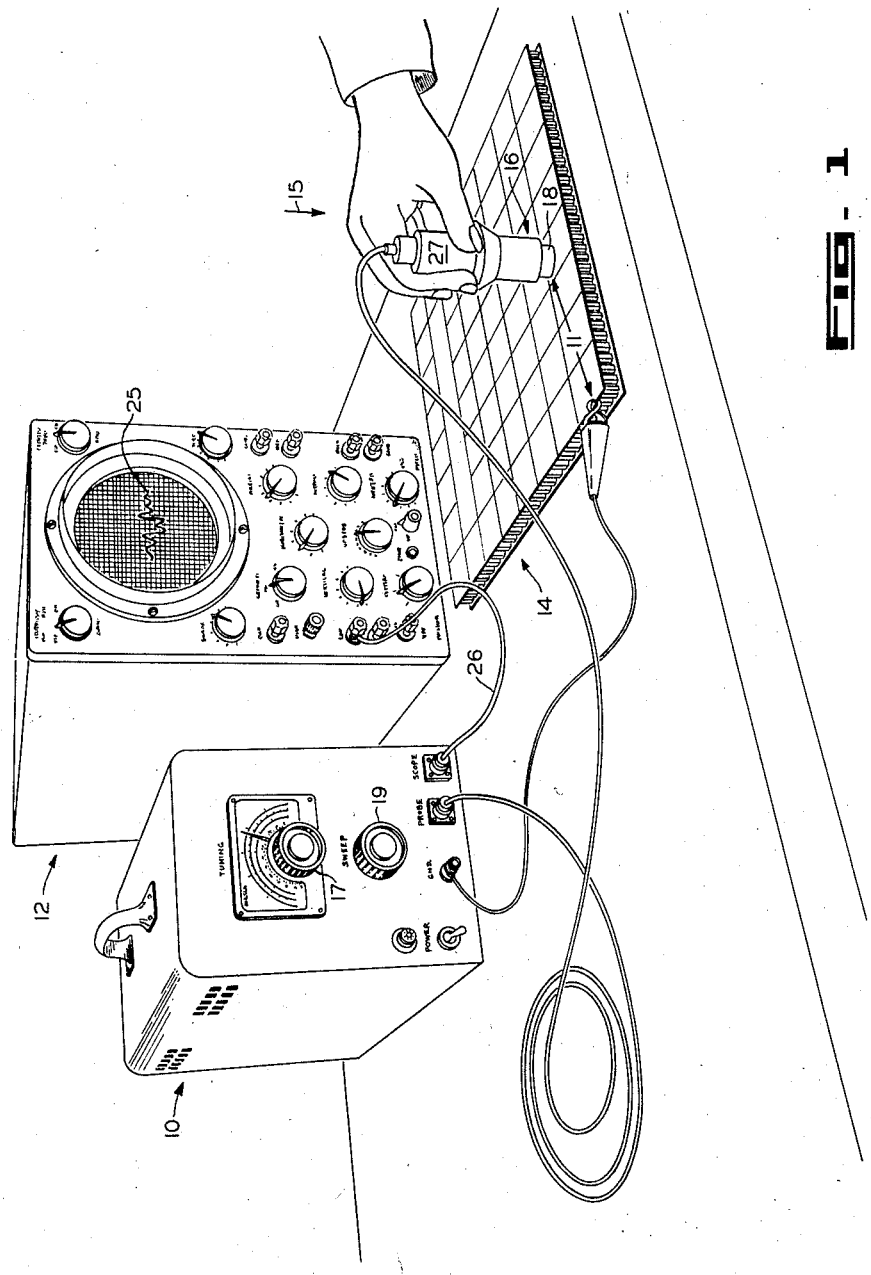
Figure 1 is a pictorial exemplification of an apparatus embodying the invention shown in connection with an adhesively bonded sandwich panel being tested.

Referring now to Figure 1 of the drawings, there is illustrated a physical embodiment of the invention in a portable chassis 10, its related oscilloscope 12, and adhesively bonded structure to be tested 14 and a probe 16 incorporating a transducer 18; the latter of which is acoustically coupled 11 to the object workpiece 14 being tested for voids and condition-of-bond. Coupling of the ceramic transducer 18 is made to said workpiece 14 through an oil film medium (not shown) by placing the probe upon the oiled surface with moderate manual pressure 15. Tuning of the instrument at 17 and sweep 19 as operational techniques are subsequently described herein.

When an electromechanical transducer such as a barium titanate ($BaTiO_3$) ceramic, a magnetostrictive device, or a suitable piezoelectric element 18, is excited at its natural resonant frequency, its electrical impedance will be substantially determined by the damping effect, or mechanical impedance of the mechanical load placed upon the piezoelectric element's face. The electrical impedance is then a function of this mechanical impedance. The present instrument, with the piezoelectric crystal mechanically coupled to the test specimen, is adapted to detect, display and measure said electrical impedance. In order to measure this impedance, the piezoelectric crystal is excited from a high impedance source including oscillator 22 and high impedance capacitor C5. Under such conditions the current in the transducer circuit does not change appreciably with the minute changes in crystal impedance, but the voltage across the piezoelectric transducer is proportional to the electrical impedance thereof.

Inasmuch as such changes in impedance are small and since the change is all that it is necessary to measure, the circuit of this invention is adapted to measure only the change in voltage across the piezoelectric crystal. This is accomplished by excitation of the transducer crystal 18 from a varying or sweeping frequency source. Said frequency is swept through the resonant frequency of the transducer and the resonant response of the piezoelectric crystal to the object test specimen is observed, and visually compared to the response from a reference standard specimen or comparator, the comparator being a specimen having predetermined, "built-in" conditions-of-bond, such as known voids, etc.

An 807 electronic tube V3 in a Colpitts oscillator circuit, well-known to those skilled in the art, comprises the alternating voltage souce for driving the transducer crystal 18. This oscillator is preferably designed to generate a substantial amount of power which is consumed in the form of plate dissipation, even though relatively little power is actually delivered to the transducer crystal. A constant current high voltage source for the piezoelectric transducer crystal circuit is thereby provided. Coupling capacitor C5 is preferably of low capacity, and therefore presents a high impedance at the driving frequency in order that the required constant current operating conditions of the crystal may be realized. Further, capacitor C5 serves to isolate the crystal 18 from the oscillator 22 to prevent loading of the oscillator by the crystal. Tank circuit of the oscillator comprises dual tuning capacitor C3 and a saturable reactor L1. The inductance of the signal winding of this reactor L1 is controlled by the direct current flowing in the control winding. The steady state direct current in the reactor is established by the plate current of one-half of 6SN7 tube V2, functioning as a cathode follower; said current being adjusted by R4. A triangular sweep voltage is applied to the grid of triode V2, and the frequency of the oscillator is induced to sweep over a wide range in step with the triangular sweep voltage.

Figure 3:
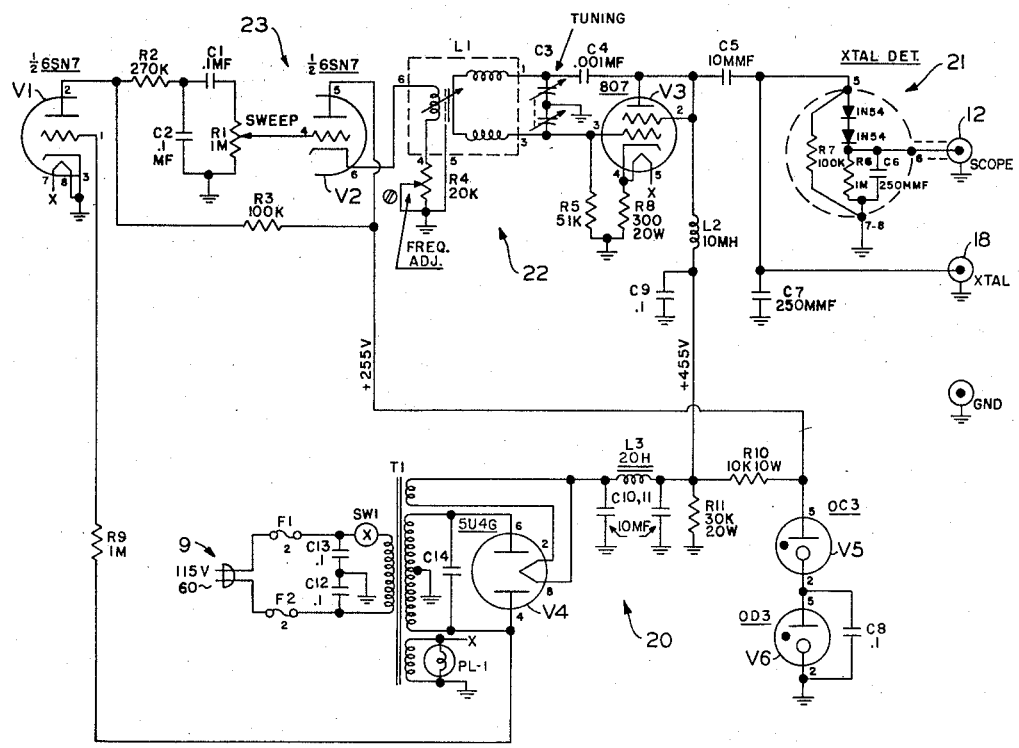
Figure 3 is the circuit diagram of an apparatus embodying the present invention which will be referred to in describing the operation of the block diagram shown in Figure 2.
Figure 2:
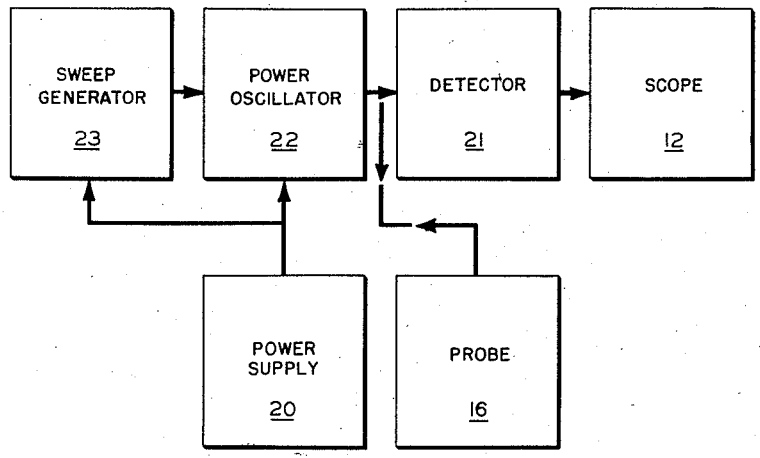
Figure 2 is a functional block diagram of an ultrasonically induced, mechanical impedance responsive system embodying the present invention.
Figure 4A:
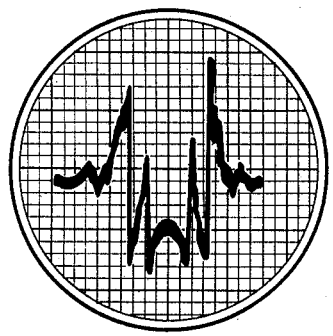
Figures 4a, 4b, 4c and 4d illustrate certain typical wave forms of mechanical impedance response, as visually displayed on an oscilloscope screen.
Figure 4B:
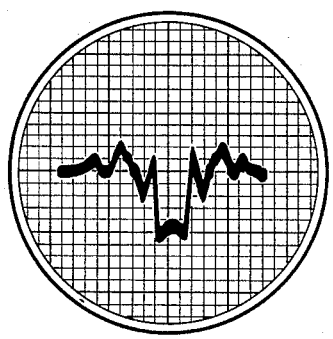
Figure 4C:
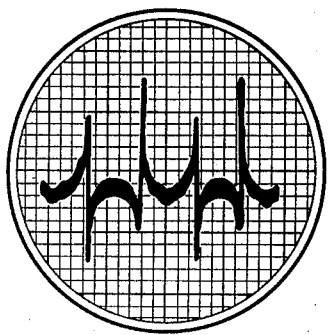
Figure 4D:
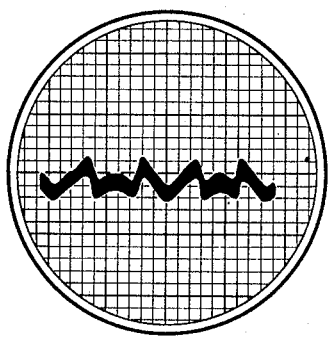

The triangular sweep voltage generator circuit is generally indicated by 23 (Figures 2 and 3). The sweep voltage applied to the cathode follower grid is generated by this circuit consisting of an overdriven triode amplifier employing grid and "cut-off" limiting and an integrating circuit, consisting of R2 and C2. The square wave generated by one-half the 6SN7 tube V1, connected as an overdriven amplifier, is converted to a triangular wave by the integrating circuit. Said triangular wave is employed to drive the cathode follower resulting in a substantial linear frequency sweep. The sweep width is controlled by the potentiometer R1, which in turn, controls the amplitude of the triangular sweep voltage. The high voltage required to drive the overdriven amplifier is taken directly from one end of the high voltage winding of the power transformer T1. This also synchronizes the frequency sweep rate with the line frequency of 60 cycles per second.

The diode detector, generally indicated by 21 (Figures 2 and 3) is constructed as a composite assembly in a "plug-in" type unit. With such arrangement excellent electrostatic shielding is achieved. Composite diode detector 21 comprises two serially connected type 1N54 germanium diodes with associated filters. Such filtering is accomplished by said diodes being loaded with a serially connected 1 megohm resistor shunted by a 250 micro-microfarad condenser serving to filter out the radio-frequency component of the detected voltage. The input of the detector is connected directly across the transducer and the output is connected to the high gain input of the oscilloscope 12. It will be noted from an examination of Figure 3 that capacitor C7 and resistor R7 are connected directly across the piezoelectric crystal; thus, C7 prevents a high radio-frequency voltage from appearing across the diodes when the piezoelectric crystal is disconnected and R7 precludes any high direct voltage charge from being built up across the predominantly capacitive piezoelectric transducer crystal. Further, R7 provides a direct current return path for the detector diodes. The diode detector unit functions to detect amplitude modulations of the sweep frequency as effected by the changes in impedance of the transducer. Said demodulated signal is thereupon directed via cable 26 (Figure 1) into cathode ray oscilloscope 12 for amplification and visual display of this response 25 (Figure 1), also see Figures 4a, 4b, 4c and 4d. The oscilloscope 12 is generally understood by those versed in the art, therefore, a general description here is not deemed to be requisite for a complete understanding of the invention. Suffice it to say that the oscilloscope provides a necessary means for graphically plotting changes in piezoelectric transducer impedance against frequency. Provided only that it has adequate gain, any well-known conventional cathode ray oscilloscope may be suitably employed for the purposes of the invention. A single power transformer T1 delivers power to the complete system. A 5U4G tube V4 connected as a full wave rectifier is used into a condenser input filter composed of C10, C11 and L3. Said power supply delivers 455 volts D. C. to the oscillator and sweep generator voltage regulators V5 and V6; 255 volts D. C. for the overdriven amplifier being derived from the said sweep generator voltage regulators.

Probe component 16 is comprised of a barium titanate piezoelectric element 18 and a holder 27 (Figure 1). Transducer piezoelectric crystal 18 is mounted in such manner that the rear face is free to vibrate; the only damping effect on the crystal being that caused by the object test specimen itself.

The thickness resonant mode of the crystal is approximately 400 kilocycles for a disc one-quarter of an inch in thickness. The shape and amplitude of the resonance curve, as viewed on the oscilloscope, indicates cause of bond failure. A sample panel or comparator, of the type to be tested is prepared having known bad bonds, such as voids, contaminated bonds, low pressure bonds and undercured bonds. Each type of bad bond has a distinctive impedance versus frequency characteristic, thereby presenting a distinctive display on the oscilloscope screen. By photographing these displays and referring to the photographs when testing a production panel, the cause of bond failure may be determined. Generally speaking, however, only the peak-to-peak amplitude need be read in conventional use; a relatively high amplitude indicating a sub-standard bond. A second method of tuning, which is often desirable under test conditions, drives the transducer crystal at a frequency of approximately 250 kilocycles, which is the radial vibration mode resonant frequency of the transducer crystal. This frequency is rather far removed from the thickness resonance frequency of 400 kilocycles of the transducer employed, and interference from spurious mode resonant frequencies inherent in barium titanate crystals adjacent to the true thickness resonance frequency is minimized. The radial resonant frequency vibration of 250 kilocycles does not, however, provide wave shape displays enabling analysis of the cause of bond failure, but merely enables location of any areas of the panel which may be poorly bonded.

Figures 4a, 4b, 4c and 4d illustrate typical results taken from the actual testing of sample panels known to have the indicated faults. Said panels were .040 inch aluminum alloy face plates or skin bonded into "sandwich" panels with fiberglas cellular core or "honeycomb" filler. A sensitivty of approximately four to one of a void indication over a good bond indication is to be noted. Two methods of tuning, as mentioned above, are depicted here. Tuning A sweeps through the 400 kilocycle thickness vibration mode resonance of the piezoelectric crystal. Tuning B sweeps through a center frequency of approximately 250 kilocycles; the latter frequency being selected in accordance with the radial vibration mode resonance characteristics of the type of piezoelectric crystal employed. Tuning A, in general, is most effective for testing adhesively bonded panels 14, comprising cellular core and face plates due to the vibration induced in the panel normal to the plane of the face plates and parallel to the core structure, as illustrated in Figure 1; tuning B being more effective when adhesively bonded metal-to-metal type joints (not shown) are the objects of the condition-of-bond tests due to radial vibration of the crystal inducing shear stresses between the two bonded parallel metal pieces.

Prior to operation, certain prerequisites must be complied with. Inasmuch as the operation of the instrument of the present invention is predicated upon comparative effect upon the impedance of the vibrating crystal by the mechanical vibration characteristics of a bonded structure, certain standards must be established for reference. The preferred practice is to construct standard panel structures or comparators of identical materials and face plate gauges as those of the object structures to be tested. Further, the condition-of-bond in any given area of these comparators must be known and are therefore "built-in" conditions. Since there may be some small variations in the conditions of a good bond, the void is preferably employed as a standard. A single point on the void is usually designated as a reference standard, since, in the process of bonding, the face plate may be inadvertently pre-stressed, thus giving some variation in reading even over a void area. Comparators, such as that described above, will thus contain a void for use as a standard, in calibrating the instrument, also a reference "good" bond.

A further prerequisite is the selective tuning of the instrument to sweep through a resonant frequency of the crystal in the probe. As heretofore delineated, there are a plurality of frequencies that may be employed selected on the basis of the crystal employed and the structural character and composition of the object bonded component.

Synchronizing the present instrument and its oscilloscope is a yet further prerequisite to the operation of the instrument embodying the invention. Most conventional oscilloscopes are adapted for externally synchronizing the horizontal sweep to the line frequency of 60 c. p. s. Since the present instrument's sweep is driven by the line frequency, a very stable scope response picture can be effected by driving the scope sweep from this same source. On some commercial models this is accomplished by switching the sweep selector to "Line," while on others it is effected with a jumper from a line frequency outlet terminal to the external Sync. terminal.

In operation, 115 v. current enters the circuit at 9, this voltage is stepped up through regulating power transformer T1, rectified by V4 and filtered through C10, C11 and L3 and further regulated by V5 and V6. This comprises the power supply 20, which delivers well regulated plate voltage to power oscillator 22 and sweep generator 23. Power oscillator 22 delivers voltage to probe 16 through the high impedance of C5, effectuating a constant current operating condition; triangular wave sweep generator 23 modulates the frequency of the power oscillator 22 to sweep over a wide range. As said frequency sweeps through the natural resonant frequency of piezoelectric crystal 18, a change in voltage amplitude develops across the piezoelectric crystal which is a function of the mechanical impedance of the mechanically loaded piezoelectric crystal. This change in voltage amplitude is detected by detector 21 and applied the vertical input of oscilloscope 12. Thus, changes in mechanical impedance, of the bonded component being tested, are visually displayed as voltage variations on the oscilloscope. These voltage responses are identified as conditions-of-bond in the object test component, and by relating such voltage responses to the comparator specimens, such conditions may be categorized as "standard" or "sub-standard."

While certain preferred embodiments of the invention have been specifically disclosed, it is understood that the invention is not limited thereto as many variations will be readily apparent to those skilled in the art and the invention is to be given its broadest possible interpretation within the terms of the following claims:

I claim:

1. Apparatus for determining a characteristic of a structure comprising: a first triode electron discharge device having a control electrode connected to a sinusoidal, low frequency, high voltage source, an anode connected to a high direct voltage source through a high load resistance, and a cathode connected to ground potential whereby said sinusoidal voltage saturates said electron discharge device and a low frequency square wave appears at said anode, an integrating circuit connected to said anode whereby said square wave is converted to a triangular wave; a second electron discharge device connected to said integrating circuit in a cathode follower circuit responsive to said triangular wave, a variable inductor having a first winding serially connected in circuit with said second electron discharge device and a second winding connected to a capacitor, said variable inductor and said capacitor comprising a resonant circuit having a resonant frequency varying in accordance with said triangular wave; a third electron discharge device having a control electrode connected to a first terminal of said resonant circuit, an anode and a screen electrode connected to a second terminal of said resonant circuit, and a cathode, said third electron discharge device and said resonant circuit comprising in combination a high powered, high frequency oscillator wherein the high frequency signal is frequency modulated in accordance with said triangular wave; a high impedance output capacitor connected to said oscillator to provide a substantially constant current frequency modulated signal; a piezoelectric transducer having a resonant frequency within the frequency band of said frequency modulated signal and accoustically coupled to said structure whereby amplitude modulation is imposed upon said frequency modulated signal in accordance with a characteristic of said structure, a diode detector connected to said piezoelectric transducer for detecting said amplitude modulation, and a cathode ray oscilloscope connected to said diode detector for displaying detected amplitude modulation representing a characteristic of said structure.

2. Apparatus for determining a characteristic of a structure comprising: a first triode electron discharge device having a control electrode connected to a sinusoidal, low frequency, high voltage source, an anode connected to a high direct voltage source through a high load resistance, and a cathode connected to ground potential whereby said sinusoidal voltage saturates said electron discharge device and a low frequency square wave appears at said anode, an integrating circuit comprising a variable resistor and a shunt capacitor connected to said anode whereby said square wave is converted to a triangular wave; a second electron discharge device connected to said integrating circuit in a cathode follower circuit responsive to said triangular wave, a variable inductor having a first winding serially connected in circuit with said second electron discharge device and a second winding connected to a capacitor, said variable inductor and said capacitor comprising a resonant circuit having a resonant frequency varying in accordance with said triangular wave; a third electron discharge device having a control electrode connected to a first terminal of said resonant circuit, an anode and a screen electrode connected to a second terminal of said resonant circuit, and a cathode, said third electron discharge device and said resonant circuit comprising in combination a high powered, high frequency oscillator wherein the high frequency signal is frequency modulated in accordance with said triangular wave; a high impedance output capacitor connected to said oscillator to provide a substantially constant current frequency modulated signal; a piezoelectric transducer having a resonant frequency within the frequency band of said frequency modulated signal and accoustically coupled to said structure whereby amplitude modulation is imposed upon said frequency modulated signal in accordance with a characteristic of said structure; a diode detector connected to said piezoelectric transducer for detecting said amplitude modulation, and a cathode ray oscilloscope connected to said diode detector for displaying detected amplitude modulation representing a characteristic of said structure.

3. Apparatus for determining a characteristic of a structure comprising: a first triode electron discharge device having a control electrode connected to a sinusoidal, low frequency, high voltage source, an anode connected to a high direct voltage source through a high load resistance, and a cathode connected to ground potential whereby said sinusoidal voltage saturates said electron discharge device and a low frequency square wave appears at said anode, an integrating circuit comprising a variable resistor and a shunt capacitor connected to said anode whereby said square wave is converted to a triangular wave; a second electron discharge device connected to said integrating circuit in a cathode follower circuit responsive to said triangular wave, a variable inductor having a first winding serially connected in circuit with said second electron discharge device and a second winding connected to a capacitor, said variable inductor and said capacitor comprising a resonant circuit having a resonant frequency varying in accordance with said triangular wave; a third electron discharge device having a control electrode connected to a first terminal of said resonant circuit, an anode and a screen electrode connected to a second terminal of said resonant circuit, and a cathode, said third electron discharge device and said resonant circuit comprising in combination a high powered, high frequency oscillator wherein the high frequency signal is frequency modulated in accordance with said triangular wave; a high impedance output capacitor connected to said oscillator to provide a substantially constant current frequency modulated signal; a piezoelectric transducer having a resonant frequency within the frequency band of said frequency modulated signal and acoustically coupled to said structure whereby amplitude modulation is imposed upon said frequency modulated signal in accordance with a characteristic of said structure; a capacitor connected in parallel with said piezoelectric transducer; a diode detector connected to said piezoelectric transducer for detecting said amplitude modulation, and a cathode ray oscilloscope connected to said diode detector for displaying detected amplitude modulation representing a characteristic of said structure.

4. Apparatus for determining a characteristic of a structure comprising: a first triode electron discharge device having a control electrode connected to a sinusoidal, low frequency, high voltage source, an anode connected to a high direct voltage source through a high load resistance, and a cathode connected to ground potential whereby said sinusoidal voltage saturates said electron discharge device and a low frequency square wave appears at said anode, an integrating circuit comprising a variable resistor and a shunt capacitor connected to said anode whereby said square wave is converted to a triangular wave; a second electron discharge device connected to said integrating circuit in a cathode follower circuit and responsive to said triangular wave, a variable inductor having a first winding serially connected in circuit with said second electron discharge device and a second winding connected to a capacitor, said variable inductor and said capacitor comprising a resonant circuit having a resonant frequency varying in accordance with said triangular wave; a third electron discharge device having a control electrode connected to a first terminal of said resonant circuit, an anode and a screen electrode connected to a second terminal of said resonant circuit, and a cathode, said third electron discharge device and said resonant circuit comprising in combination a high powered, high frequency oscillator wherein the high frequency signal is frequency modulated in accordance with said triangular wave; a high impedance output capacitor connected to said oscillator to provide a substantially constant current frequency modulated signal; a piezoelectric transducer having a resonant frequency within the frequency band of said frequency modulated signal and acoustically coupled to said structure whereby amplitude modulation is imposed upon said frequency modulated signal in accordance with a characteristic of said structure, a capacitor connected in parallel with said piezoelectric transducer; a detector connected in parallel with said piezoelectric transducer for detecting said amplitude modulation, and a cathode ray oscilloscope connected in series with said diode detector for displaying detected amplitude modulation representing a characteristic of said structure.

5. Apparatus for determining a characteristic of a structure comprising: a first triode electron discharge device having a control electrode connected to a sinusoidal, low frequency, high voltage source, an anode connected to a high direct voltage source through a high load resistance, and a cathode connected to ground potential whereby said sinusoidal voltage saturates said electron discharge device and a low frequency square wave appears at said anode, an integrating circuit comprising a variable resistor and a shunt capacitor connected to said anode whereby said square wave is converted to a triangular wave; a second electron discharge device connected to said integrating circuit in a cathode follower circuit and responsive to said triangular wave, a variable inductor having a first winding serially connected in circuit with said second electron discharge device and a second winding connected to a capacitor, said variable inductor and said capacitor comprising a resonant circuit having a resonant frequency varying in accordance with said triangular wave; a third electron discharge device having a control electrode connected to a first terminal of said resonant circuit, an anode and a screen electrode connected to a second terminal of said resonant circuit, and a cathode, said third electron discharge device and said resonant circuit comprising in combination a high powered, high frequency oscillator wherein the high frequency signal is frequency modulated in accordance with said triangular wave; a high impedance output capacitor serially connected to said oscillator to provide a substantially constant current frequency modulated signal; a piezoelectric transducer having a resonant frequency within the frequency band of said frequency modulated signal and acoustically coupled to said structure whereby amplitude modulation is imposed upon said frequency modulated signal in accordance with a characteristic of said structure, a capacitor connected in parallel with said piezoelectric transducer; a detector assembly including a diode having a cathode and an anode for detecting said amplitude modulation and a shielded container for said detector assembly, connected in parallel with said piezoelectric transducer; and a cathode ray oscilloscope connected in series with said diode detector for displaying detected amplitude modulation representing a characteristic of said structure.

6. Apparatus for determining a characteristic of a structure comprising: a first triode electron discharge device having a control electrode connected to a sinusoidal, low frequency, high voltage source, an anode connected to a high direct voltage source through a high load resistance, and a cathode connected to ground potential whereby said sinusoidal voltage saturates said electron discharge device and a low frequency square wave appears at said anode, an integrating circuit comprising a variable resistor and a shunt capacitor connected to said anode whereby said square wave is converted to a triangular wave; a second electron discharge device connected to said integrating circuit in a cathode follower circuit and responsive to said triangular wave, a variable inductor having a first winding serially connected in circuit with said second electron discharge device and a second winding connected to a capacitor, said variable inductor and said capacitor comprising a resonant circuit having a resonant frequency varying in accordance with said triangular wave; a third electron discharge device having a control electrode connected to a first terminal of said resonant circuit, an anode and a screen electrode connected to a second terminal of said resonant circuit, and a cathode, said third electron discharge device and said resonant circuit comprising in combination a high powered, high frequency oscillator wherein the high frequency signal is frequency modulated in accordance with said triangular wave; a high impedance output capacitor serially connected to said oscillator to provide a substantially constant current frequency modulated signal; a piezoelectric transducer having a resonant frequency within the frequency band of said frequency modulated signal and acoustically coupled to said structure whereby amplitude modulation is imposed upon said frequency modulated signal in accordance with a characteristic of said structure, a capacitor and a resistor connected in parallel with said piezoelectric transducer; a detector assembly connected in parallel with said piezoelectric transducer, said detector assembly including a diode for detecting said amplitude modulation, a resistor and a capacitor connected in parallel between said diode and ground potential, and a shielded container connected to ground potential for shielding said detector assembly; and a cathode ray oscilloscope connected in series with said diode detector for displaying detected amplitude modulation representing a characteristic of said structure.

7. Apparatus for determining a characteristic of a structure comprising: a first triode electron discharge device having a control electrode connected to a sinusoidal, low frequency, high voltage source, an anode connected to a high direct voltage source through a high load resistance, and a cathode connected to ground potential whereby said sinusoidal voltage saturates said electron discharge device and a low frequency square wave appears at said anode, an integrating circuit comprising a variable resistor and a shunt capacitor connected to said anode whereby said square wave is converted to a triangular wave; a second electron discharge device connected to said integrating circuit in a cathode follower circuit and responsive to said triangular wave, a variable inductor having a first winding serially connected in circuit with said second electron discharge device and a second winding connected to a capacitor, said variable inductor and said capacitor comprising a resonant circuit having a resonant frequency varying in accordance with said triangular wave; a third electron discharge device having a control electrode connected to a first terminal of said resonant circuit, an anode and a screen electrode connected to a second terminal of said resonant circuit, and a cathode, a first resistor connected to said control electrode and a second resistor connected to said cathode, said first and second resistor being returned to ground potential whereby said third electron discharge device, said first and second resistors and said resonant circuit comprise in combination a high powered, high frequency oscillator wherein the high frequency signal is frequency modulated in accordance with said triangular wave; a high impedance output capacitor serially connected to said oscillator to provide a substantially constant current frequency modulated signal; a piezoelectric transducer having a resonant frequency within the frequency band of said frequency modulated signal and acoustically coupled to said structure whereby amplitude modulation is imposed upon said frequency modulated signal in accordance with a characteristic of said structure, a capacitor and a resistor connected in parallel with said piezoelectric transducer; a detector assembly connected in parallel with said piezoelectric transducer, said detector assembly including a diode for detecting said amplitude modulation, a resistor and a capacitor connected in parallel between said diode and ground potential, and a shielded container connected to ground potential for shielding said detector assembly, and a cathode ray oscilloscope connected in series with said diode detector for displaying detected amplitude modulation representing a characteristic of said structure.

References Cited in the file of this patent

UNITED STATES PATENTS

| | | |
|---|---|---|
| 2,384,716 | Wengel | Sept. 11, 1945 |
| 2,439,131 | Firestone | Apr. 6, 1948 |
| 2,499,459 | Carlin | Mar. 7, 1950 |
| 2,605,633 | Gow | Aug. 5, 1952 |